W. DOLL.
ROTARY BROILER.
APPLICATION FILED SEPT. 15, 1909.
980,501.
Patented Jan. 3, 1911.
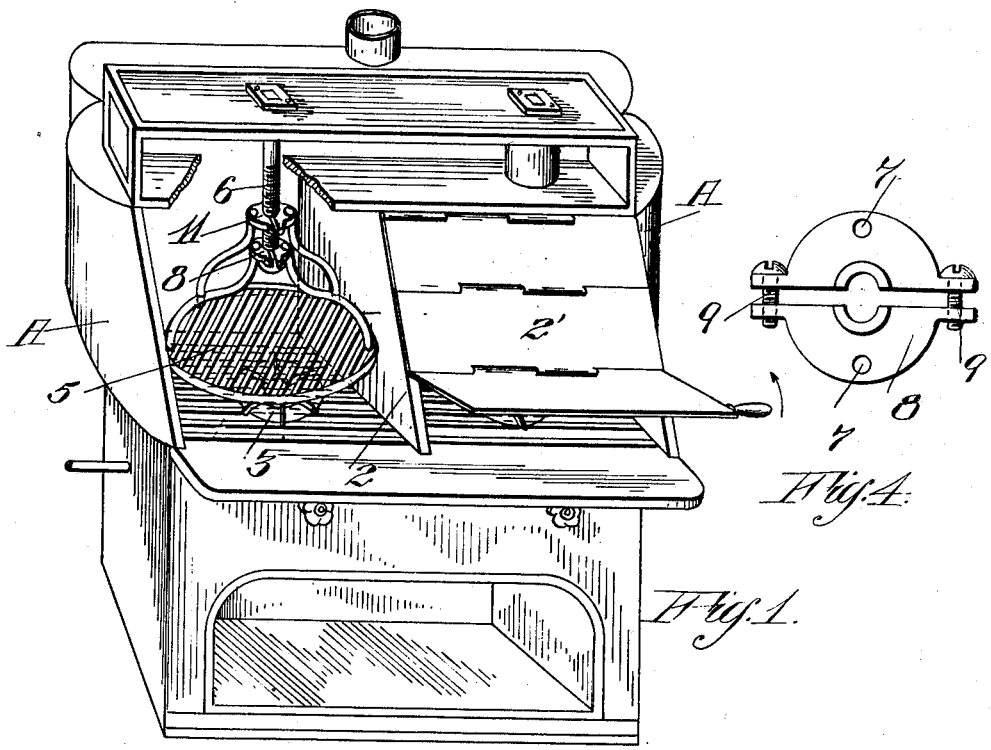
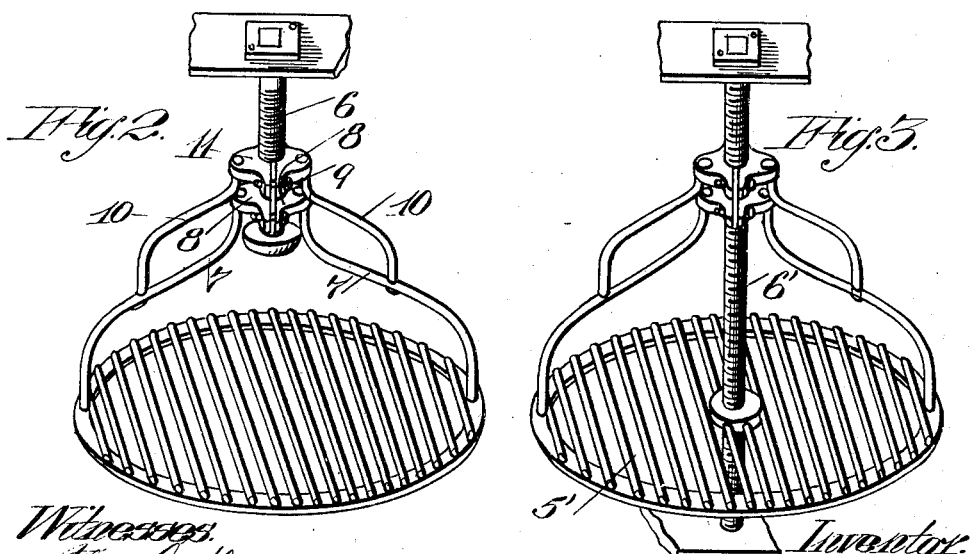
Witnesses:
Thos. Castberg.
F. E. Maynard.
Inventor:
William Doll.
by G. H. Strong.
his Atty.

UNITED STATES PATENT OFFICE.

WILLIAM DOLL, OF SAN FRANCISCO, CALIFORNIA, ASSIGNOR OF ONE-HALF TO CARL L. UNGAR, OF SAN FRANCISCO, CALIFORNIA.

ROTARY BROILER.

980,501. Specification of Letters Patent. Patented Jan. 3, 1911.

Application filed September 15, 1909. Serial No. 518,062.

*To all whom it may concern:*

Be it known that I, WILLIAM DOLL, a citizen of the United States, residing at No. 1720 Pine street, San Francisco, in the county of San Francisco and State of California, have invented a new and useful Rotary Broiler, of which the following is a specification.

This invention relates to broilers for cooking meat and other food stuffs.

A purpose of my invention is to provide a reliable, convenient and satisfactory broiler, which embodies means whereby a more accurate flavoring and cooking of delicate edibles is obtained; to provide a broiler of large capacity and great scope of operation; to provide a broiler involving facilities whereby an increased output and decreased loss is obtained; and a further object is to provide a broiler having a removable gridiron adaptable to a large range of adjustments with other advantages hereinafter apparent.

The invention consists of the parts and the construction and combination of parts as hereinafter more fully described and claimed, having reference to the accompanying drawings, in which—

Figure 1 is a perspective of the improved broiler, partly broken away. Fig. 2 illustrates the grill. Fig. 3 shows a modified form of same. Fig. 4 is a detail of the split nut.

My invention embodies a casing A of any preferred size, form or material, having one or more ovens separated by the transverse vertical partition 2, and having any appropriate heating means, as the gas burners 3.

The casing A, as shown, forms a "double-broiler," one of the ovens being covered by a partly open, foldable cover 2', the cover of the adjacent oven being omitted to better show a gridiron 5, which latter is turnable and vertically adjustable within its oven space, upon a strong, screw-threaded hanger or stud 6, rigidly secured to the top plate of the casing A.

Any appropriate means may be employed to removably connect the gridiron 5 to the hanger or stud 6, and I have shown a form which permits easy, quick adjustment and removal of the iron; as here shown a pair of arms 7—7 are secured at opposite points to the rim of the gridiron and curved upwardly and inwardly, the ends being secured in respective sections of a split, threaded collar 8 engaging and turnable on the hanger or stud 6. The split collar is held together with bolts 9—9, by means of which the frictional engagement of the collar on the stud may be nicely adjusted so that the gridiron 5 may be swung around freely or may be clamped in a given position. If desired, the arms 7 may be supplemented by providing braces 10—10 fastened to the arms 7—7, and having a threaded, split collar 11, also turnable on the screw-threaded hanger or stud 6, just above collar 8, thereby giving rigidity to the structure.

Where it is necessary to use a very large gridiron the hanger or stud 6', Fig. 3, may be extended down through the gridiron 5' and secured at its lower end in the bottom of the oven, thus immovably and firmly supporting the stud and gridiron.

The operation of the broiler is as follows: Fire having been made and sufficient heat accumulated in the oven, the articles to be broiled are arranged upon the gridiron 5, and this is then vertically adjusted to adapt it to the required heat by simply turning it around the fixed screw-threaded hanger or stud 6, and screwing the gridiron up or down to such a height above the fire as the judgment of the chef determines is proper for the article being cooked. By means of this vertical adjustment of the gridiron with respect to the fire, proper heat is obtained without interfering with the burner, but more particularly the rotary feature of the gridiron is important because it gives the chef easy access to whatever is on any part of the gridiron without having to draw out the gridiron or remove, even for an instant, the viands being cooked, from over the fire. It is well known that in the old type of broiler using a sliding gridiron which has to be drawn back and forth over the fire whenever the articles on the back of the gridiron are to be removed or turned, those articles on the front of the gridiron necessarily undergo certain deteriorations due to the change of heat and uneven cooking. When it is necessary to remove or turn over any articles from or on the back of my gridiron, the gridiron is easily rotated part of a revolution so that it is not necessary to reach in across the gridiron. In addition to these important objects and advantages, the gridiron may be quickly raised or lowered the maximum distance without the chef having to lift anything from it, or without pulling it out of the oven, and an important feature of the invention is that no exterior attachments or appliances are required, there are no complex parts to become burned or injured, and the only movable member is the rotary gridiron.

By the term burner in this specification and in the claims I include any desired heating appliance, such as wood, coal, charcoal or coke burning fire box, or gas or oil burner electric heater or equivalent.

Having thus described my invention, what I claim and desire to secure by Letters-Patent, is:

1. The combination with a single stationary support, a casing, a burner therein, and a gridiron within the casing above the burner, said gridiron having upwardly extending arms and means at the upper ends of the arms engaging said support and permitting the gridiron to be turned thereon, and means for fixedly securing the gridiron to the support in any position to which the gridiron has been adjusted.

2. A broiler comprising a casing, a burner therein, and a screw-threaded hanger fixed within the casing, of a gridiron having upwardly extending arms, an internally threaded collar at the upper ends of the arms and engaging the threads of said hanger whereby the gridiron may be adjusted toward and from the burner, and means for fixedly securing the collar to the hanger to hold the gridiron against turning movement in any position to which it may be adjusted.

3. In a broiler, the combination of a casing, a burner, and a threaded hanger fixed within the casing, a gridiron having upwardly extending arms, a split collar connecting the upper ends of said arms and having a central opening engaging the threaded portion of the hanger whereby the gridiron may be adjusted to different vertical heights, and a clamping means connected with the split portion of the collar and adapted to bind the collar rigidly to the hanger to hold the gridiron against radial movement in any position to which it has been adjusted.

WILLIAM DOLL.

Witnesses:
HARRY C. LATHER,
LAWRENCE DE PASQUALE.